US012712199B2

(12) United States Patent
Fan et al.

(10) Patent No.: US 12,712,199 B2
(45) Date of Patent: Aug. 18, 2026

(54) SECONDARY BATTERY AND ELECTRICAL DEVICE

(71) Applicant: CONTEMPORARY AMPEREX TECHNOLOGY (HONG KONG) LIMITED, Hong Kong (CN)

(72) Inventors: Guoling Fan, Ningde (CN); Xinxin Du, Ningde (CN); Daichun Tang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 23 days.

(21) Appl. No.: 18/974,517

(22) Filed: Dec. 9, 2024

(65) Prior Publication Data

US 2026/0155427 A1 Jun. 4, 2026

Related U.S. Application Data

(63) Continuation of application No. PCT/CN2022/122039, filed on Sep. 28, 2022.

(51) Int. Cl.
*H01M 10/0525* (2010.01)
*H01M 4/131* (2010.01)
(Continued)

(52) U.S. Cl.
CPC ....... *H01M 10/0525* (2013.01); *H01M 4/131* (2013.01); *H01M 4/133* (2013.01); (Continued)

(58) Field of Classification Search
CPC ........... H01M 4/366; H01M 2004/021; H01M 2010/4292
See application file for complete search history.

(56) References Cited

U.S. PATENT DOCUMENTS

2015/0107093 A1* 4/2015 Luo ..................... H01M 4/0404 427/122
2017/0317389 A1 11/2017 Tamaki et al.
2021/0336244 A1 10/2021 Kang et al.

FOREIGN PATENT DOCUMENTS

CN 109273771 A 1/2019
CN 109449447 A 3/2019
(Continued)

OTHER PUBLICATIONS

CN115101803 English translation. Liu et al. China. Sep. 23, 2022. (Year: 2022).*
International Search Report for PCT Application PCT/CN2022/122039, mailed May 16, 2023, 5 pages.
Written Opinion for PCT Application PCT/CN2022/122039, mailed May 16, 2023, 7 pages.
Extended European Search Report, mailed Feb. 2, 2026, for corresponding European Patent Application Serial No. 22959903.0.
(Continued)

*Primary Examiner* — Christopher P Domone
(74) *Attorney, Agent, or Firm* — K&L Gates LLP

(57) ABSTRACT

A secondary battery includes a positive electrode plate and a negative electrode plate; the positive electrode plate includes a positive electrode current collector and a positive electrode film layer arranged on at least one of the surfaces of the positive electrode current collector, the positive electrode film layer includes a positive electrode active material, the negative electrode plate includes a negative current collector and a negative electrode film layer arranged on at least one of the surfaces of the negative current collector, the negative electrode film layer includes a negative electrode active material; the secondary battery satisfies $0.15 \le (1000^*(B/A))/((T^*D)^*(\pi^2/4)) \le 0.50$, in which B/A represents the capacity-excess coefficient of the negative electrode of the secondary battery, dimensionless, T represents the thickness of the negative electrode film layer, in μm, and D represents the volume average particle size Dv50 of the negative electrode active material, in μm.

20 Claims, 3 Drawing Sheets

(51) Int. Cl.

| | |
|---|---|
| ***H01M 4/133*** | (2010.01) |
| ***H01M 4/134*** | (2010.01) |
| ***H01M 4/36*** | (2006.01) |
| ***H01M 4/38*** | (2006.01) |
| ***H01M 4/505*** | (2010.01) |
| ***H01M 4/525*** | (2010.01) |
| ***H01M 10/44*** | (2006.01) |
| *H01M 4/02* | (2006.01) |
| *H01M 10/42* | (2006.01) |

(52) U.S. Cl.

CPC ........... *H01M 4/134* (2013.01); *H01M 4/366* (2013.01); *H01M 4/38* (2013.01); *H01M 4/505* (2013.01); *H01M 4/525* (2013.01); *H01M 10/44* (2013.01); *H01M 2004/021* (2013.01); *H01M 2004/027* (2013.01); *H01M 2004/028* (2013.01); *H01M 2010/4292* (2013.01)

(56) References Cited

FOREIGN PATENT DOCUMENTS

| | | | |
|---|---|---|---|
| CN | 113228341 A | | 8/2021 |
| CN | 113875050 A | | 12/2021 |
| CN | 115101803 | * | 9/2022 |
| EP | 3859827 A1 | | 8/2021 |
| EP | 3944373 A1 | | 1/2022 |
| EP | 4020623 A1 | | 6/2022 |
| JP | 2019046560 A | | 3/2019 |
| WO | 2013054481 A1 | | 4/2013 |

OTHER PUBLICATIONS

Notice of Allowance (with English Machine Translation), mailed May 29, 2026, for corresponding Chinese Patent Application Serial No. 202280011385.4.

* cited by examiner

SECONDARY BATTERY AND ELECTRICAL DEVICE

CROSS-REFERENCE TO RELATED APPLICATIONS

The present application is a continuation of International Application No. PCT/CN2022/122039, filed on Sep. 28, 2022. The disclosure of the aforementioned application is hereby incorporated by reference in its entirety.

TECHNICAL FIELD

The present application relates to the field of battery, in particular to a secondary battery and an electrical device.

BACKGROUNDS

Secondary battery has high capacity and long life, and thus is widely used in an electrical device, such as a mobile phone, a laptop, a battery car, an electric car, an electric plane, an electric ship, an electric toy car, an electric toy ship, an electric toy plane, and an electric tool.

With the increasing applications of battery, the requirements for the performance of the secondary battery become increasingly stringent. Nevertheless, existing secondary battery cannot have both fast-charging performance and safety performance.

SUMMARY

The present application is made in view of the above problems, with the aim of providing a secondary battery and an electrical device.

In a first aspect, the present application provides a secondary battery comprises a positive electrode plate and a negative electrode plate; the positive electrode plate comprises a positive electrode current collector and a positive electrode film layer which is arranged on at least one of the surfaces of the positive electrode current collector and comprises a positive electrode active material, and the negative electrode plate comprises a negative current collector and a negative electrode film layer which is arranged on at least one of the surfaces of the negative current collector and comprises a negative electrode active material; the secondary battery satisfies $0.15 \leq (1000*(B/A))/((T*D)*(n^2/4)) \leq 0.50$, in which A represents the reversible capacity of the positive electrode active material per unit area of the positive electrode current collector, B represents the reversible capacity of the negative electrode active material per unit area of the negative electrode current collector; B/A represents the capacity-excess coefficient of the negative electrode of the secondary battery, dimensionless; T represents the thickness of the negative electrode film layer, in μm, D represents the volume average particle size Dv50 of the negative electrode active material, in μm; and n represents that the maximum current during charging is n times of the nominal capacity of the secondary battery.

Under the condition that the secondary battery satisfies $0.15 \leq (1000*(B/A))/((T*D)*(n^2/4)) \leq 0.50$, the negative electrode active material has sufficient remaining vacancies for the intercalation of the active ions such as lithium ions, so as to avoid the overpotential caused by the surface polarization of the negative electrode plate, which makes the potential with reference to the lithium be lower than the lithium-deposition potential of the lithium metal and further causes the problems such as lithium deposition. Accordingly, the secondary battery can be ensured to have safety performance when being charged at a high rate.

In some embodiments, the secondary battery satisfies $0.15 \leq (1000*(B/A))/((T*D)*(n^2/4)) \leq 0.40$; and optionally, $0.20 \leq (1000*(B/A))/((T*D)*(n^2/4)) \leq 0.35$.

In some embodiments, the secondary battery, at at least one point of time $T_0$ during charging, has a charging current $I_0$ that is greater than or equal to n times of the nominal capacity, $2.8 \leq n$, optionally, $4 \leq n \leq 8$, and optionally, $4 \leq n \leq 6$ or $6 \leq n \leq 8$.

In some embodiments, the secondary battery, during charging to from 10% state-of-charge to 70% state-of-charge, has an average charging current I, that is greater than or equal to n times of the nominal capacity, $4 \leq n$, optionally, $4 \leq n \leq 8$, and optionally, $4 \leq n \leq 6$ or $6 \leq n \leq 8$; optionally, the secondary battery, during charging to from 20% state-of-charge to 60% state-of-charge, has an average charging current I that is greater than or equal to n times of the nominal capacity.

In some embodiments, the secondary battery satisfies at least one of the following conditions from (1) to (3): (1) $1.20 \leq B/A \leq 1.50$, and optionally, $1.20 \leq B/A \leq 1.30$; (2) $20 \leq T \leq 200$, and optionally, $40 \leq T \leq 150$; and (3) $1 \leq D \leq 30$, and optionally, $5 \leq D \leq 15$. Under the condition that the secondary battery of the present application satisfies one or several of the above conditions, the performance of the secondary battery can be further improved.

In some embodiments, the negative electrode film layer comprises a first film layer which comprises the first negative electrode active material and is arranged on the surface of the negative electrode current collector, and a second film layer which comprises the second negative electrode active material and is arranged between the first film layer and the negative electrode current collector; the first negative electrode active material and the second negative electrode active material are one or more each independently selected from artificial graphite, natural graphite, soft carbon, hard carbon, silicon-based material, tin-based material, and lithium titanate; optionally, the first negative electrode active material and the second negative electrode active material are different materials; and optionally, the first negative electrode active material comprises the artificial graphite, and the second negative electrode active material comprises the artificial graphite and the natural graphite.

Accordingly, the first film layer is arranged far away from the negative electrode current collector or in other words, closer to the outside. During the forming of the film on the negative electrode plate, the first negative electrode active material is required to have more excellent pressure resistance because it directly contacts with the equipment such as a rolling equipment. In view of this, a material having better pressure resistance, such as an artificial graphite, may be selected, so as to reduce the risk that the first negative electrode active material may be crushed and broken during forming the film layer, and improve the structural stability of the first film layer and improve the structural stability of the first film layer. The second negative electrode active material indirectly contacts with the equipment such as a rolling equipment, and thus may have lower pressure resistance. In order to improve the fast-charging performance of secondary battery, however, the material that is more conducive to the migration of active ions, such as the artificial graphite and the natural graphite, may be selected as the negative electrode active materials.

In some embodiments, the secondary battery satisfies $0 < T2*D2 - T1*D1 \leq 2000$, in which T1 represents the thickness of the first film layer, in μm; T2 represents the thickness of the second film layer, in μm; D1 represents the volume average particle size Dv50 of the first negative electrode active material, in μm; and D2 represents the volume average particle size Dv50 of the second negative electrode active material, in μm.

Under the condition that the secondary battery satisfies T2*D2>T1*D1, the problems such as lithium deposition can be reduced that result from the over potential caused by the surface polarization of the negative electrode plate and making the potential with reference lithium lower than the lithium-deposition potential of the lithium metal. Accordingly, the safety performance of the secondary battery can be further improved.

In some embodiments, the secondary battery satisfies at least one of the following conditions from (I) to (IV): (I) $10 \le T1 \le 110$; (II) $5 \le D1 \le 20$; (III) $10 \le T2 \le 110$; and (IV) $2 \le D2 \le 15$.

In some embodiments, the secondary battery further satisfies V>V2, in which V represents the OI value of the negative electrode film layer, and V2 represents the OI value of the second film layer; optionally, $0.1 \le V \le 25$; and optionally, $0.1 \le V2 \le 5$. Under the condition that the secondary battery satisfies the above condition(s), the cycling performance, fast-charging performance, and safety performance of the secondary battery can be improved.

In some embodiments, the positive electrode active material has a molecular formula of $Li_xA_yNi_aCo_bMn_cM_{(1-a-b-c)}Y_z$, in which $0 \le x \le 2.1$, $0 \le y \le 2.1$, $0.9 \le x+y \le 2.1$, $0 \le a \le 1$, $0 \le b \le 1$, $0 \le c \le 1$, $0.1 \le a+b+c \le 1$, and $1.8 \le z \le 3.5$; A is one or more selected from Na, K, and Mg; M is one or more selected from B, Mg, Al, Si, P, S, Ca, Sc, Ti, V, Cr, Fc, Cu, Zn, Sr, Y, Zr, Nb, Mo, Cd, Sn, Sb, Te, Ba, Ta, W, Yb, La, and Ce; and Y is one or more selected from O and F.

Accordingly, in the ternary material system of the present application, with the increasing of nickel content, the capacity of the materials increases. Under the condition that the ternary material system satisfies $0.15 \le (1000*(B/A))/((T*D)*(n^2/4)) \le 0.5$, the secondary battery can have both the fast-charging performance and the safety performance.

In a second aspect, the present application provides an electrical device including a secondary battery according to any embodiment of the first aspect of the present application.

BRIEF DESCRIPTION OF THE DRAWINGS

In order to provide a clearer explanation of the technical solution of the embodiments of the present application, a brief introduction will be given to the accompanying drawings required in the embodiments of the present application. It is evident that the accompanying drawings described below are only some embodiments of the present application. For ordinary technical personnel in the art, other accompanying drawings can be obtained based on the drawings without any creative effort.

Figure 1:
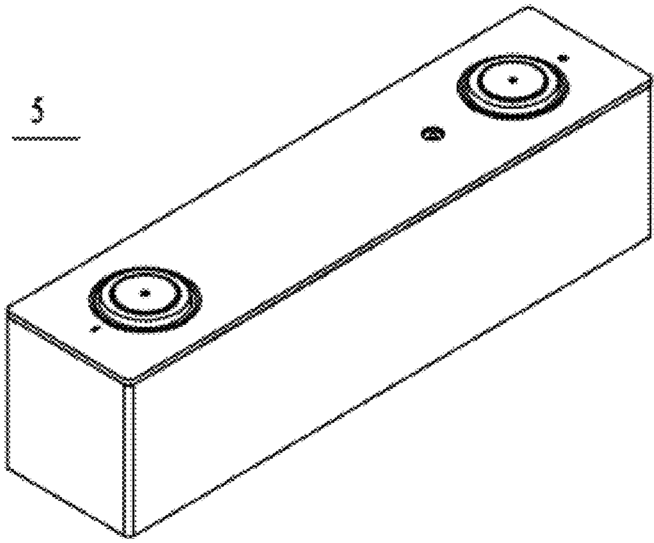
FIG. 1 is a schematic diagram of the secondary battery according to an embodiment of the present application.

The accompanied drawings may not necessarily be drawn to the actual scale.

The references in the accompanied drawings is described as follows:

1. Battery pack; 2. Upper box; 3. Lower box; 4. Battery module;

5. Secondary battery; 51. Housing; 52. Electrode assembly;

53. Cover plate; and

6. Electrical device.

DETAILED DESCRIPTION

Hereinbelow, the implementation of the secondary battery and the electrical device as disclosed in the present application will be explained in detail. However, there may be situations where unnecessary detailed explanations may be omitted. For example, there are situations where detailed explanations of well-known matters are omitted and repeated explanations of the same structure are actually provided. This is to avoid the following explanations becoming unnecessarily lengthy and easy for those skilled in the art to understand. In addition, the accompanying drawings and the following explanations are provided for those skilled in the art to fully understand the present application and are not intended to limit the subject matter recorded in the claims.

The "scope" disclosed in the present application is limited in the form of a lower limit and an upper limit. The given scope is limited by selecting a lower limit and an upper limit, and the selected lower limit and upper limit the boundary of the special scope. The range limited in this way can include or exclude end values, and can be arbitrarily combined, that is, any lower limit can be combined with any upper limit to form a range. For example, if a range of 60-120 and 80-110 is listed for specific parameters, it is also expected to be understood as a range of 60-110 and 80-120. In addition, if the minimum range values 1 and 2 are listed, and if the maximum range values 3, 4, and 5 are listed, the following ranges can all be expected: 1-3, 1-4, 1-5, 2-3, 2-4, and 2-5. In the present application, unless otherwise specified, the numerical range "a-b" represents an abbreviated representation of any combination of real numbers between a and b, where a and b are both real numbers. For example, the numerical range "0-5" indicates that all real numbers between "0-5" have been listed in this article, and "0-5" is only a shortened representation of these numerical combinations. In addition, when expressing an integer with a parameter of ≥2, it is equivalent to disclosing that the parameter is, for example, integers 2, 3, 4, 5, 6, 7, 8, 9, 10, 11, 12, etc.

Unless otherwise specified, all implementations and optional implementations of the present application can be combined to form new technical solutions. Unless otherwise specified, all technical features and optional technical features of the present application can be combined to form a new technical solution.

Unless otherwise specified, all steps of the present application can be carried out in sequence or randomly, preferably in sequence. For example, the method includes steps (a) and (b), indicating that the method can include steps (a) and (b) that are sequentially performed, as well as steps (b) and (a) that are sequentially performed. For example, mentioning a method can also include step (c), indicating that step (c) can be added to the method in any order. For example, the method can include steps (a), (b), and (c), as well as steps (a), (c), and (b), and can also include steps (c), (a), and (b).

Unless otherwise specified, the terms "comprise/comprising", "include/including", or "contain/containing" mentioned in the present application indicate the open-ended mode, but also can be interpret as the closed-ended mode. For example, "comprise/comprising", "include/including", or "contain/containing" may indicate that other components that are not listed may be comprised, included, or contained, or only listed components may be comprised, included, or contained.

Unless otherwise specified, in the present application, the wording 'or' is inclusive. For example, the phrase "A or B" means "A, B, or both A and B. More specifically, any of the following conditions satisfy the condition "A or B": A is true (or exists) and B is false (or does not exist); A is false (or non-existent) and B is true (or exists); Or both A and B are true (or present).

In the present application, the terms "a plurality of" and "multiple" refer to two or more than two.

During charging, the active ions (such as lithium ions and sodium ions) diffuse from the interior of the positive electrode active material to the electrolyte, then pass through the separator and diffuse to the surface between the negative electrode active material and the electrolyte, and finally enter the negative electrode active material where they undergo the intercalation reaction; the free electrons migrate into the negative electrode current collector via the positive electrode current collector and the external circuit, and then the free electrons react with active ions to complete the charging process.

During charging, the battery polarization resulting from hindered transmission of active ions among the positive electrode active material, the electrolyte, and the negative electrode active material is inevitable, especially in the field of fast-charging. With the increasing of charging rate, the battery polarization may be increased. The battery polarization may result in the crystallization of active ions on the surface of the negative electrode plate, which will pose a safety risk. For example, the crystallization of active ions on the surface of the negative electrode plate may further result in lithium dendrites which may puncture the separator and thus cause a short circuit between the positive electrodes plate and the negative electrodes plate, posing a safety risk to secondary battery.

In view of the above, the inventors have found that in the field of fast-charging, the parameters, such as the negative electrode active materials, the negative electrode film layer, and the positive electrode film layer, have certain effect on the safety performance of secondary battery. The inventors, through a large number of experiments, conclude and present a formula related to battery design, $(1000*(B/A))/((T*D)*(n^2/4))$. Under the condition that the above formula satisfy a specific range of values, the secondary battery can have improved safety performance while meeting the fast-charging performance of secondary batteries. Hereinbelow, the detailed explanation of the present application will be given.

Secondary Battery

In the first aspect, the present application provides a secondary battery comprising a positive electrode plate and a negative electrode plate, in which the positive electrode plate comprises a positive electrode current collector and a positive electrode film layer arranged on at least one of the surfaces of the positive electrode current collector, in which the positive electrode film layer comprises a positive electrode active material, and the negative electrode plate comprises a negative current collector and a negative electrode film layer arranged on at least one of the surfaces of the negative current collector, in which the negative electrode film layer comprises a negative electrode active material;

the secondary battery satisfies $0.15 \leq (1000*(B/A))/((T*D)*(n^2/4)) \leq 0.50$, in which B/A represents the capacity-excess coefficient of the negative electrode of the secondary battery, dimensionless, A represents the reversible capacity of the positive electrode active material per unit area of the positive electrode current collector, B represents the reversible capacity of the negative electrode active material per unit area of the negative electrode current collector, T represents the thickness of the negative electrode film layer, in μm, and D represents the volume average particle size Dv50 of the negative electrode active material, in μm.

The inventors, through a large number of experiments, conclude and present the formula related to battery design, $(1000*(B/A))/((T*D)*(n^2/4))$. The inventors have found that under the condition that the above formula satisfy the specific range of values, the secondary battery can have both good fast-charging performance and good safety performance.

The secondary battery of the present application is suitable to be charged at high rate, and the secondary battery of the present application may be defined as nC secondary battery.

The nC secondary battery may refer to a secondary battery which has a charging current $I_0$ that is greater than or equal to n times of the nominal capacity at at least one point of time $T_0$ during charging.

Furthermore, the nC secondary battery may refer to a secondary battery which has a an average charging current $I_\tau$ that is greater than or equal to n times of the nominal capacity during charging to 10% state-of-charge (SOC) to 70% state-of-charge (SOC).

Furthermore, the nC secondary battery may refer to a secondary battery which has a an average charging current $I_\tau$ that is greater than or equal to n times of the nominal capacity during charging to 20% state-of-charge (SOC) to 60% state-of-charge (SOC).

In the present application, $2.8 \leq n$, optionally, $4 \leq n \leq 8$, and optionally, $4 \leq n \leq 6$ or $6 \leq n \leq 8$. For example, n may be 4, 5, 6, 7, 8 etc.

SOC in the present application represents the state of charge of the secondary battery; it reflects the actual capacity of the secondary battery. When the secondary battery is not charged, it is considered that the capacity of the secondary battery may be denoted as $A_0$, corresponding to 0% SOC; and when the secondary battery is fully charged, it is considered that the capacity of the secondary battery may reach the rated capacity denoted as A mAh, corresponding to 100% SOC. During the charging of the secondary battery, under the condition that the capacity of the secondary battery is x % $(A-A_0)$ mAh, it corresponds to x % SOC, in which x % may be any value ranging from 0 to 100; for example, x may be 70, which means that the secondary battery is charged to an capacity of 70% $(A-A_0)$ mAh, corresponding to 70% SOC.

SOC may be determined by methods and equipment well-known in the art, such as the ampere-hour integration method. In particular, the initial capacity $A_0$ of the secondary battery when it is not charged is determined; the current charged into the secondary battery is integrated over time to calculate the capacity $A_t$ of the secondary battery; the percentage of $A_t$ to (the difference between the rated capacity A and the initial capacity $A_0$) is the percentage of SOC.

In the present application, the secondary battery may be charged by means of Constant Current Constant Voltage (CCCV), Multistage Constant Current Charging (MCC), Variable Current Decay Charging (VCD), Constant Power Constant Voltage (CPCV), pulse charging, etc.

For example, when n is 4, the secondary battery is a 4 C secondary battery, which means that the instantaneous current during charging is greater than or equal to 4 times of the nominal capacity. Specifically, the secondary battery, during charging, has a charging current $I_0$ that is greater than or equal to 4 times of the nominal capacity at at least one point of time $T_0$. Accordingly, the secondary battery may have the charging current that is greater than or equal to 4 times of the nominal capacity at only one point of time. Of course, the secondary battery may have the charging current that is greater than or equal to 4 times of the nominal capacity at a plurality of points of time. For example, the secondary battery may have an average charging current $I_\tau$ that is greater than or equal to 4 times of the nominal capacity during charging from 10% SOC to 70% SOC. Optionally, the secondary battery may have an average charging current $I_\tau$ that is greater than or equal to 4 times of the nominal capacity during charging from 20% SOC to 60% SOC. In the present application, the average charging current $I_\tau$ means the average of the absolute values of the charging current during this stage.

For example, when n is 6, the secondary battery is a 6 C secondary battery, which means that the instantaneous current during charging is greater than or equal to 6 times of the nominal capacity. Specifically, the secondary battery, during charging, has a charging current $I_0$ that is greater than or equal to 6 times of the nominal capacity at at least one point of time $T_0$. Accordingly, the secondary battery may have the charging current that is greater than or equal to 6 times of the nominal capacity at only one point of time (such as using VCD charging). Of course, the secondary battery may have the charging current that is greater than or equal to 6 times of the nominal capacity at a plurality of points of time (such as using VCD or MCC charging). For example, the secondary battery may have an average charging current I, that is greater than or equal to 6 times of the nominal capacity during charging from 10% SOC to 70% SOC. Optionally, the secondary battery may have an average charging current I, that is greater than or equal to 6 times of the nominal capacity during charging from 20% SOC to 60% SOC.

The above-mentioned secondary battery is the high-rate rechargeable battery, which has higher requirements for fast-charging performance; as a result, there will be a higher risk of active ions deposition during charging. Nevertheless, under the condition that the secondary battery of the present application satisfies the formula $0.15 \le (1000*(B/A))/((T*D)*(n^2/4)) \le 0.50$, it is ensured that the secondary battery can be charged at a high rate, while being improved in fast-charging performance, safety performance, and service life. Optionally, $0.15 \le (1000*(B/A))/((T*D)*(n^2/4)) \le 0.40$, and further optionally $0.20 \le (1000*(B/A))/((T*D)*(n^2/4)) \le 0.35$.

In the above formula, B/A represents the capacity-excess coefficient of the negative electrode of the secondary battery, which represents the relationship between the capacity that can be received by the negative electrode active material and the capacity that is released by the positive electrode active material. Specifically, when the positive and negative electrode plate and the positive electrode active material, which have identical area, are arranged opposite to each other, the ratio of the reversible capacity of the negative electrode active material to the reversible capacity of the positive electrode active material, i.e. the capacity-excess coefficient of negative electrode B/A, B/A=the reversible capacity of the negative electrode active material denoted as B/the reversible capacity of the positive electrode active material denoted as A.

A may be understood as reversible capacity per unit area and may be determined using equipment and methods well-known in the art. For example, the positive electrode film layer of the present application and a metal lithium sheet may form a counter electrode, with a polyethylene PE film being the separator; then a few drops of electrolytic solution that is used in the secondary battery of the present application may be dropped; a button type battery is assembled in a glove box under argon protection; and the charging capacity is determined using a blue electric tester (CT2001A) to determine A.

B may be understood as reversible capacity per unit area and may be determined using equipment and methods well-known in the art. For example, the negative electrode film layer of the present application and a metal lithium sheet may form a counter electrode, with a polyethylene PE film being the separator; then a few drops of electrolytic solution that is used in the secondary battery of the present application may be dropped; a button type battery is assembled in a glove box under argon protection; and the charging capacity is determined using a blue electric tester (CT2001A) to determine B.

During charging, a part of the active ions that deintercalate out of the positive electrode plate form a solid-electrolyte interphase (SEI) film on the surface of the negative electrode active material, and the other part of active ions intercalate into the negative electrode active material; different capacity-excess coefficient of the negative electrode B/A may render the negative electrode plate be at different SOC states under the condition that the secondary battery is fully charged. The higher capacity-excess coefficient of the negative electrode B/A, the lower the SOC state of the negative electrode under the condition that the secondary battery is fully charged; under the condition that the negative electrode plate is at a lower SOC state, it has less expansion and less side reactions, which is conductive to improving the fast-charging and cycling performance of the secondary battery. Under the condition that the B/A value is high, the negative electrode active material has more vacancies to receive active ions, and thus the risk of lithium deposition of the active ions on the surface of the negative electrode active material is low. Under the condition that the negative electrode capacity excess coefficient B/A of the secondary battery is low, the negative electrode may be at an excessively high SOC state under fully-charged state; when being charged at high charging rate, the negative electrode potential is low due to the polarization, which is likely to lead to the reduction and deposition of active ions on the negative electrode and thus poses a high safety risk. In addition, the high capacity-excess coefficient of the negative electrode should not be too high, because for the same SOC of the full batteries, the higher the capacity-excess coefficient of a negative electrode, the higher the corresponding intrinsic potential of the negative electrode with reference to lithium, which makes the SEI film unstable; accordingly, the storage life of the secondary battery may be affected; when storing at low SOC, SEI may be more likely to decompose to produce gas, posing high safety risk. Optionally, 1.10≤B/A≤1.50; more optionally, 1.20≤B/A≤1.50; even more optionally, 1.20≤B/A≤1.30. For example, B/A may be 1.20, 1.25, 1.30, 1.40, 1.50, or the range formed by any two of the values as mentioned above.

In the above formula, T represents the thickness of the negative electrode film layer, having the unit in μm.

The thickness of the negative electrode film layer denoted as T refers to the thickness of the negative electrode film layer on one of the surfaces of the negative electrode current collector; it may be tested using equipment and methods well-known in the art. For example, the negative electrode film layer is applied on one surface of the negative electrode current collector, under the fully discharged state of the secondary battery, the thickness at least 12 different positions of the negative electrode plate may be measured using a micrometer along the thickness direction of the negative electrode plate, the average value is taken as the thickness of the negative electrode plate; the thickness of the negative electrode plate minuses the thickness of the negative current collector is the thickness of the negative electrode film layer.

During the charging of the secondary battery, the negative electrode usually undergoes the following electrochemical processes: (1) the active ions (such as lithium ions and sodium ions) that deintercalate out of the positive electrode active material enter into the electrolytic solution and into the pores of the negative electrode film layer with the electrolytic solution, to achieve the liquid-phase conduction of the active ions inside the pores, including liquid-phase diffusion and electromigration; (2) the active ions and electrons achieve charge exchange on the surface of the negative electrode active material; and (3) the active ions undergoes solid-phase conduction from the surface of the negative electrode active material to the interior of the negative electrode active material crystal.

During the solid-phase conduction, the thickness T of the negative electrode film layer is of vital importance to the migration of active ions in the negative electrode active material. The larger the thickness T, the longer the migration path of active ions, that is, the greater the resistance to active ions when undergoing solid-phase conduction from the surface of the negative electrode active material to the interior of the active material crystal, which is not conducive to the fast-charging of secondary battery. When the thickness T of the negative electrode film layer is large, the migration rates of active ions in different parts of the negative electrode film layer may be different, which may cause the phenomena such as concentration polarization and thus lead to local lithium deposition in the negative electrode film layer; as a result, there may be a safety risk during charging. On the contrary, the smaller the thickness T of the negative electrode film layer, the shorter the migration path of active ions during the solid-phase conduction, which is conducive to the fast-charging of secondary battery. Optionally, 20≤T≤200, further optionally, 40≤T≤150, and even further optionally, 60≤T≤105. For example, the thickness of the negative electrode film layer may be 20 μm, 30 μm, 40 μm, 50 μm, 60 μm, 70 μm, 80 μm, 90 μm, 100 μm, 105 μm, 110 μm, 120 μm, 130 μm, 140 μm, 150 μm, or within the range formed by any two of the values as mentioned above.

In the above formula, D represents the volume average particle size Dv50 of the negative electrode active material, and Dv50 corresponds to the particle size when the cumulative volume distribution percentage of the material reach 50%. Particularly, Dv50 value indicates that 50%, relative to the total volume, of the particles have the particle size greater than this value, and the other 50%, relative to the total volume, of the particles have the particle size less than this value. Dv50 value of the negative electrode active material may be determined according to the method specified in GB/T19077-2016 Particle size analysis-Laser diffraction method on a Laser Particle Size Analyzers, such as the Mastersizer 2000E laser particle size analyzer from Marvin Instruments Limited, UK.

Under the condition that the volume average particle size Dv50 of the negative electrode active material is within a specific range, the structure of the negative electrode active material is stable, so during the solid-phase conduction of active ions, the migration path of active ions in the negative electrode active material is short, which is conducive to the fast transmission of active ions; as a result, the dynamic performance of secondary battery is good, which is conducive to improving the fast-charging performance of secondary battery. Moreover, the active ions migrate fast and thus they are not likely to accumulate on the surface of the negative electrode film, thereby reducing the risk of the deposition of the active ions; accordingly, the safety performance of secondary battery can be improved. Optionally, 1≤D≤30, more optionally, 5≤D≤15, and even more optionally 8≤D≤14. For example, the volume average particle size Dv50 of the negative electrode active material may be 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 18 μm, 20 μm, 25 μm, 30 μm, or the range formed by any two of the values as mentioned above.

Hereinabove, the effects of each parameter alone on the secondary battery are discussed. In the practical application of the secondary battery, however, the above parameters are interrelated and inseparable. During the charging and discharging cycle of the secondary battery, due to the volume change of the negative electrode film layer, the positive and negative electrode active materials may lose their capacities continuously, and the parameters such as B/A, T, and D in the secondary battery dynamically change. The three parameters are related via the above formula provided by the inventors, and they have a combined effect on the fast-charging performance and safety performance of the secondary battery. Under the condition that the secondary battery satisfies $0.15 \leq (1000*(B/A))/((T*D)*(n^2/4)) \leq 0.50$, the negative electrode active material has sufficient remaining vacancies for the intercalation of the active ions such as lithium ions, so as to avoid problems such as lithium resulting from the overpotential caused by the surface polarization of the negative electrode plate and making the potential with reference to lithium lower than the lithium-deposition potential of the lithium metal. Accordingly, the secondary battery can be ensured to have safety performance when being charged at a high rate. Under the condition that the secondary battery does not satisfy the above formula, it is more likely to trigger safety issues due to the deposition of the active ions during high-rate charging.

Negative Electrode Plate

The inventors of the present application have found through in-depth research that the structural and material of the negative electrode plate have a certain impact on the fast-charging performance and safety performance of the secondary battery.

The negative electrode plate includes a negative current collector and a negative electrode film layer arranged on at least one of the surfaces of the negative current collector, in which the negative electrode film layer includes a negative electrode active material.

As an example, the negative electrode current collector has two surfaces opposite in the thickness direction thereof, and the negative film layer is arranged on one of or two of the opposite surfaces of the negative current collector.

In some embodiments, the negative electrode current collector may be a metal foil or a composite current collector. For example, as a metal foil, copper foil can be used. The composite current collector may include a polymer material substrate and a metal layer formed on at least one surface of the polymer material substrate. The composite current collectors can be formed by forming metal materials (copper, copper alloys, nickel, nickel alloys, titanium, titanium alloys, silver, and silver alloys, etc.) onto polymer substrates such as polypropylene (PP), polyethylene terephthalate (PET), polybutylene terephthalate (PBT), polystyrene (PS), polyethylene (PE).

In some embodiments, the negative electrode film layer may have a single-layer structure, which may make the material particles evenly distribute inside the layer and thus is conducive to ensuring the performance uniformity of the negative electrode film layer and reducing the risk of deposition of the active ions on local areas of the negative electrode film layer; accordingly, the safety performance of secondary battery is improved. The negative electrode active material in the negative electrode film layer having the single-layer structure may be one or more selected from artificial graphite, natural graphite, soft carbon, hard carbon, silicon-based materials, tin-based materials, and lithium titanate. Furthermore, the negative electrode active material may be one or more selected from artificial graphite, natural graphite, and silicon-based material.

In other embodiments, the negative electrode film layer may have a multi-layer structure, such as a two-layer structure, a three-layer structure, or even a structure of more than three layers. Different layers have identical or different materials. Under the condition that different layers have identical material, there may be no clear boundary between the layers. Under the condition that different layers have different materials, the interface may be observed and determined by equipment such as electron microscopy.

For example, under the condition that the negative electrode film layer includes a two-layer structure, the negative electrode film layer includes a first film layer including a first negative electrode active material and a second film layer including a second negative electrode active material, the first film layer is arranged on the surface of the negative electrode current collector, and the second film layer is arranged between the first film layer and the negative electrode current collector, that is, the second film layer is arranged on at least one of the surfaces of the negative current collector, and the first film layer is arranged on the surface of the second film layer away from the negative current collector. Optionally, the first negative electrode active material and the second negative electrode active material are selected from different materials. The first film layer is arranged away from the negative electrode current collector or in other words, closer to the outside. During the forming of the film on the negative electrode plate, the first negative electrode active material, because it directly contacts with the equipment such as a rolling equipment, is required to have more excellent pressure resistance. In view of this, a material having better pressure resistance, such as an artificial graphite, may be selected, so as to reduce the risk that the first negative electrode active material may be crushed and broken during forming the film layer, and improve the structural stability of the first film layer and improve the structural stability of the first film layer. The second negative electrode active material indirectly contacts with the equipment such as a rolling equipment, and thus may have lower pressure resistance. In order to improve the fast-charging performance of secondary battery, however, the material that is more conducive to the migration of active ions, such as the artificial graphite and the natural graphite, may be selected as the negative electrode active materials. Under the condition that the artificial graphite is mixed with the natural graphite, the artificial graphite and the natural graphite have the mass ratio of from 1:9 to 9:1. Specifically, based on the total mass of the second negative electrode active material, the mass content of natural graphite ranges from 1% to 90%.

Under the condition that the secondary battery of the present application satisfies the two-layer design of the negative electrode film layer, if it optionally satisfies one or more of the following parameters, the performance of the secondary battery may be further improved.

In some embodiments, the secondary battery satisfies $0<T2*D2-T1*D1\leq 2000$. Optionally, $200<T2*D2-T1*D1\leq 500$.

T1 represents the thickness of the first film layer, in μm, and T2 represents the thickness of the second film layer, in μm. T1 and T2 may be determined by the method and equipment well-known in the art. Specifically, the negative electrode plate may be taken as a sample, a cross-section may be cut from the middle of the negative electrode plate, and the thin plate may be analyzed and tested by scanning electron microscopy to obtain SEM images; the thickness at multiple (such as more than 30) different positions may be measured on the SEM images, and the average value is taken as the average thickness. Under the condition that the first film layer and the second film layer are selected from different materials, a clear boundary between the first film layer and the second film layer may be observed on the SEM image.

Under the condition that the thickness of the first film layer, T1, is within an appropriate range, the first film layer can be ensured to have good pressure resistance; in addition, the migration path of active ions is short, which is conducive to improving the fast-charging performance of secondary battery. Optionally, $10\leq T1\leq 110$. More optionally, $25\leq T1\leq 45$.

Under the condition that the thickness of the second film layer, T2, is within an appropriate range, the migration path of active ions in the second film layer can be ensured to be short, which is conducive to the fast-charging performance of the secondary battery. Optionally, $10\leq T2\leq 110$. More optionally, $40\leq T2\leq 90$. Even more optionally, $40\leq T2\leq 65$.

D1 represents the volume average particle size Dv50 of the first negative electrode active material, in μm, and D2 represents the volume average particle size Dv50 of the second negative electrode active material, in μm. D1 and D2 may be determined by the method and equipment well-known in the art. Specifically, the active material powder in the first film layer and the second film layer may be scraped using a scraper, and the scraped powder may be sonicated in deionized water as a solvent for 30 minutes to prepare a suspension sample; the suspension sample is then tested for volume average particle size Dv50 using Mastersizer 2000E laser particle size analyzer; the test is conducted according the standard GB/T 19077-2016.

The average particle size of the first negative electrode active material denoted as D1 is relatively large, when falling within an appropriate range, the capacity per unit area of the first film layer can be improved, but the fast-charging performance is relatively poor. Optionally, $5\leq D1\leq 20$. More optionally, $6\leq D1\leq 15$.

The volume average particle size of the second negative electrode active material denoted as D2 is relatively small, when falling within an appropriate range, the migration path of active ions in the second film layer may become short, thereby improving the dynamic performance of the secondary battery and improving the fast-charging performance of the secondary battery. Optionally, $2 \le D2 \le 15$. More optionally, $10 \le D2 \le 16$.

Hereinabove, the effects of each parameter T1, T2, D1, and D2 alone on the secondary battery are discussed. In the practical application of the secondary battery, however, the above parameters are interrelated and inseparable. During the charging of the secondary battery, a part of the active ions directly intercalates into the first negative electrode active material, and the other part of the active ions can enter into the second active material of the second film layer via the first film layer. The performances of the first film layer and the second film layer are closely related and thus have combined effect on the fast-charging performance and structural stability of the secondary battery. Under the condition that the secondary battery satisfies $T2*D2 \ge T1*D1$, which can avoid the overpotential caused by the surface polarization of the negative electrode plate, which makes the potential with reference to the lithium be lower than the lithium-deposition potential of the lithium metal and further causes the problems such as lithium deposition; accordingly, the safety performance of the secondary battery can be improved.

In some embodiments, the secondary battery satisfies $V \ge V2$.

V represents the OI value of the negative film layer, and V2 represents the OI value of the second film layer. For example, the negative electrode active material is selected as graphite, the OI value of the film layer may be obtained by X-ray powder diffractometer (X'pert PRO) according to the general principles of X-ray diffraction analysis and the methods of determining lattice parameters for negative electrode active materials such as graphite, JIS K 0131-1996 and JB/T4220-2011, to obtain the X-ray diffraction spectrum of the negative electrode plate; the OI value of the film layer is calculated according to the formula $V=C_{004}/C_{110}$, in which $C_{004}$ is the peak area of the 004 characteristic diffraction peak, and $C_{110}$ is the peak area of the 110 characteristic diffraction peak.

The negative electrode film has a relatively high OI value, and thus have a relatively good bonding force, which can improve the structural stability of the negative electrode plate and further improve the cycling performance of the secondary battery. Optionally, $0.1 \le V \le 25$. More optionally, $2.5 \le V \le 18$.

The second film layer has a relatively low OI value, so the active materials of the second negative electrode tend to have disorder distribution. In the second film layer, there are more effective end faces available for the deintercalation and intercalation of the active ions, which is conducive to the fast intercalation of the active ions and thus improving the fast-charging performance of secondary battery, and which makes concentration polarization less likely and thus can improve the safety performance of secondary battery. Nevertheless, when the second film layer has a low OI value, it is poor in bonding force so that the powders are likely to fall off; accordingly, the negative electrode plate is likely to wrinkle during the cycling, leading to deterioration of the reaction interface and thus a likely plunge in the cycling performance of the battery. Optionally, $0.1 \le V2 \le 5$.

Under the condition that the secondary battery satisfies the above formula, it can have improved cycling performance, fast-charging performance, and safety performance.

In some embodiments, the negative electrode film layer may optionally include a binder. The binder may be at least one selected from styrene butadiene rubber (SBR), polyacrylic acid (PAA), sodium polyacrylate (PAAS), polyacrylamide (PAM), polyvinyl alcohol (PVA), sodium alginate (SA), polymethylacrylic acid (PMAA), and carboxymethyl chitosan (CMCS). Specifically, the first film layer and the second film layer may be one or more independently selected from the above binders.

In some embodiments, the negative electrode film layer may optionally include a conductive agent. The conductive agent may be at least one selected from superconducting carbon, acetylene black, carbon black, Koqin black, carbon dots, carbon nanotubes, graphene, and carbon nanofibers. Specifically, the first film layer and the second film layer may be one or more independently selected from the above conductive agents.

In some embodiments, the negative electrode film layer may optionally include other additives, such as thickeners such as carboxymethyl cellulose sodium (CMC-Na).

In some embodiments, the negative electrode plate may be prepared as follows: the components used for preparing negative electrode plate as described above, such as the negative electrode active material, the conductive agent, the binder, and any other components, are dispersed in a solvent (such as deionized water) to form a negative electrode slurry; the negative electrode slurry is applied on the negative electrode current collector, and after processes such as drying and cold pressing, the negative electrode plate is obtained. When the negative electrode film layer includes a multi-layer structure, each film layer may be formed separately. For example, firstly, the second negative electrode active material, the conductive agent, the binder, and any other components are dispersed in a solvent (such as deionized water) to form a second negative electrode slurry; the second negative electrode slurry is applied on the negative electrode current collector, after processes such as drying and cold pressing, a second film layer is formed; then the first negative electrode active material, the conductive agent, the binder, and any other components are dispersed in a solvent (such as deionized water) to form a first negative electrode slurry; the first negative electrode slurry is applied on the negative electrode current collector; after processes such as drying and cold pressing, a first film layer is formed, and the negative electrode plate is formed accordingly.

Positive Electrode Plate

The inventors of the present application have found through in-depth research that the structural and material of the positive electrode plate have a certain impact on the fast-charging performance and safety performance of the secondary battery. Especially, the material of the positive electrode plate has a significant impact on the performance of the secondary battery.

In some embodiments, the positive electrode plate includes a positive current collector and a positive electrode film layer arranged on at least one surface of the positive current collector. For example, the positive electrode current collector has two surfaces opposite in the thickness direction thereof, and the positive electrode film layer is arranged on any one of or two of the opposite surfaces of the positive electrode current collector.

The positive electrode film layer includes a positive electrode active substance, which can be a positive electrode active substance commonly known in the art for secondary batteries. As an example, the positive electrode active substances may include at least one of the following materials: layered positive electrode active substances (such as ternary layered materials, lithium nickel/sodium layered materials, lithium cobalt/sodium layered materials, lithium manganese/sodium layered materials, lithium rich/sodium layered materials, and rock salt phase layered materials), olivine-type phosphate active substances, or spinel-structure positive electrode active substances (such as spinel lithium manganese, spinel nickel manganese, spinel lithium manganese, and nickel manganese).

For example, the layered positive electrode active substance has a general formula of $Li_xA_yNi_aCo_bMn_cM_{(1-a-c)}Y_z$, in which $0 \le x \le 2.1$, $0 \le y \le 2.1$, and $0.9 \le x+y \le 2.1$; $0 \le a \le 1$, $0 \le b \le 1$, $0 \le c \le 1$, and $0.1 \le a+b+c \le 1$; $1.8 \le z \le 3.5$; A is one or more selected from Na, K, and Mg; M is one or more selected from B, Mg, Al, Si, P, S, Ca, Sc, Ti, V, Cr, Fe, Cu, Zn, Sr, Y, Zr, Nb, Mo, Cd, Sn, Sb, Te, Ba, Ta, W, Yb, La, and Ce; and Y is one or more selected from O and F. Optionally, y=0. Specifically, the layered positive electrode active substances may include one or more of lithium cobalt oxide (LCO), lithium nickel oxide (LNO), lithium manganese oxide (LMO), $LiNi_{1/3}Co_{1/3}Mn_{1/3}O_2$ (NCM333), $LiNi_{0.8}Co_{0.1}Mn_{0.1}O_2$(NCM811), and $LiNi_{0.5}Co_{0.2}Mn_{0.3}O_2$ (NCM523).

In the ternary material system, with the increase of the nickel content, the capacity is improved. Under the condition that the ternary material system satisfies $0.15 \le (1000^*(B/A))/((T^*D)^*(n^2/4)) \le 0.50$, the fast-charging performance and safety performance of the secondary battery can be balanced.

For example, the olivine-type phosphate active substance has a general formula of $Li_xA_yMe_aM_bP_{1-c}X_cY_z$, in which $0 \le x \le 1.3$, $0 \le y \le 1.3$, and $0.9 \le x+y \le 1.3$; $0.9 \le a \le 1.5$, $0 \le b \le 0.5$, and $0.9 \le a+b \le 1.5$; $0 \le c \le 0.5$; $3 \le z \le 5$; A is one or more selected from Na, K, and Mg; Me is selected from one or more of Mn, Fe, Co, and Ni; M is one or more selected from B, Mg, Al, Si, P, S, Ca, Sc, Ti, V, Cr, Cu, Zn, Sr, Y, Zr, Nb, Mo, Cd, Sn, Sb, Te, Ba, Ta, W, Yb, La, and Ce; X is one or more selected from S, Si, Cl, B, C, and N; and Y is one or more selected from O and F. Specifically, the olivine type phosphate active substance includes one or more of $LifePO_4$, $LiMnPO_4$, $LiNiPO_4$, and $LiCoPO_4$.

For example, the spinel-structure positive electrode active substance has a general formula of $Li_xA_yMn_aM_{2-a}Y_z$, in which $0 \le x \le 2$, $0 \le y \le 1$, and $0.9 \le x+y \le 2$; $0.5 \le a \le 2$; $3 \le z \le 5$; A is one or more selected from Na, K, and Mg; M is one or more selected from Ni, Co, B, Mg, Al, Si, P, S, Ca, Sc, Ti, V, Cr, Fe, Cu, Zn, Sr, Y, Zr, Nb, Mo, Cd, Sn, Sb, Te, Ba, Ta, W, Yb, La, and Ce; and Y is one or more selected from O and F. Specifically, the spinel-structure positive electrode active substance includes one or more of $LiMn_2O_4$, $LiNi_{0.5}Mn_{1.5}O_4$, $LiCr_{0.3}Mn_{1.7}O_4$, $Li_{1.1}Al_{0.1}Mn_{1.9}O_4$, $Li_2Mn_2O_4$, and $Li_{1.5}Mn_2O_4$.

In some embodiments, the positive electrode film layer may optionally include a positive electrode conductive agent. There are no special restrictions on the types of positive electrode conductive agents in the present application. As an example, the positive electrode conductive agent includes one or more of superconducting carbon, conductive graphite, acetylene black, carbon black, Koqin black, carbon dots, carbon nanotubes, graphene, carbon nanofibers, or the combination thereof. In some embodiments, based on the total mass of the positive electrode film layer, the mass percentage of the positive electrode conductive agent is less than 5%.

In some embodiments, the positive electrode film layer may optionally include a positive electrode binder. There are no special restrictions on the types of positive electrode binders in the present application. As an example, the positive electrode binder may include one or more in combination selected from polyvinylidene fluoride (PVDF), polytetrafluoroethylene (PTFE), vinylidene fluoride tetrafluoroethylene propylene terpolymer, vinylidene fluoride hexafluoropropylene tetrafluoroethylene terpolymer, tetrafluoroethylene hexafluoropropylene copolymer, and fluoroacrylate resin. In some embodiments, based on the total mass of the positive electrode film layer, the mass percentage of the positive electrode binder is less than 5%.

In some embodiments, the positive electrode current collector may be a metal foil or composite current collector. As an example of metal foil, aluminum foil or aluminum alloy foil may be used. The composite current collector may include a polymer material base layer and a metal material layer formed on at least one of the surfaces of the polymer material base layer. As an example, the metal material may include one or more selected from aluminum, aluminum alloy, nickel, nickel alloy, titanium, titanium alloy, silver, silver alloy, and the combination thereof. The polymer material base layer may include one or more selected from polypropylene (PP), polyethylene terephthalate (PET), polybutylene terephthalate (PBT), polystyrene (PS), polyethylene (PE), and the combination thereof.

The positive electrode film layer is usually formed by applying the positive electrode slurry on the positive electrode current collector, drying, and cold pressing. The positive electrode slurry is usually formed by dispersing the positive electrode active substance, optional conductive agent, optional binder, and any other components in a solvent and stirring evenly. The solvent may be N-methylpyrrolidone (NMP), but is not limited thereto.

Electrolyte

The electrolyte plays a role in conducting ions between the positive electrode plate and the negative electrode plate. The types of electrolytes are not specifically restricted in the present application, and can be elected according to actual needs. For example, the electrolyte can be liquid, gelled or all solid.

In some embodiments, the electrolyte is an electrolytic solution. The electrolytic solution includes an electrolyte salt and a solvent.

In some embodiments, the electrolyte is an electrolytic solution. The electrolytic solution includes an electrolyte salt and a solvent.

As an example, a lithium salts may include one or more selected from lithium hexafluorophosphate ($LiPF_6$), lithium tetrafluoroborate ($LiBF_4$), lithium perchlorate ($LiClO_4$), lithium hexafluoroarsenate ($LiAsF_6$), lithium difluorosulfonyl imine (LiFSI), lithium difluorosulfonyl imine (LiTFSI), lithium trifluoromethanesulfonate (LiTFS), lithium difluorooxalate borate (LiDFOB), lithium dioxalate borate (LiBOB), lithium difluorophosphate ($LiPO_2F_2$) One or more combinations of lithium difluorooxalate phosphate (LiDFOP), lithium tetrafluorooxalate phosphate (LiTFOP), and the combination thereof.

As an example, an organic solvents may include one or more selected from ethylene carbonate (EC), propylene carbonate (PC), methyl ethyl carbonate (EMC), diethyl carbonate (DEC), dimethyl carbonate (DMC), dipropyl carbonate (DPC), methyl propyl carbonate (MPC), ethylene propyl carbonate (EPC), butyl carbonate (BC), methyl formate (MF), methyl acetate (MA), ethyl acetate (EA), propyl acetate (PA), methyl propionate (MP) One or more combinations of ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), diethyl sulfone (ESE), and the combination thereof.

In some embodiments, the electrolytic solution may optionally include an additive. For example, the additive may include a negative electrode film-forming additive, a positive electrode film-forming additive, and may include an additive that can improve certain battery performance, such as the additive that can improve battery overcharging performance, and the additive that can improve battery high or low temperature performance.

Separator

In some embodiments, the secondary battery further includes a separator. There are no special restrictions on the type of separator in the present application, and any well-known porous-structure separator with good chemical and mechanical stability can be selected.

In some embodiments, the material of the separator may be at least one selected from glass fiber, non-woven fabric, polyethylene, polypropylene, and polyvinylidene fluoride. The separator can be a single layer thin film or a multi-layer composite thin film, without special limitations. When the separator is a multi-layer composite film, the materials of each layer can be the same or different, without special restrictions.

In some embodiments, the positive electrode plate, the negative electrode plate, and the separator can be made into an electrode assembly through a winding process or a stacking process.

The shape of the secondary batteries is not specifically restricted in the present application, and can be cylindrical, square, or any other shape. FIG. 1 is an example of a square structured secondary battery 5.

Figure 2:
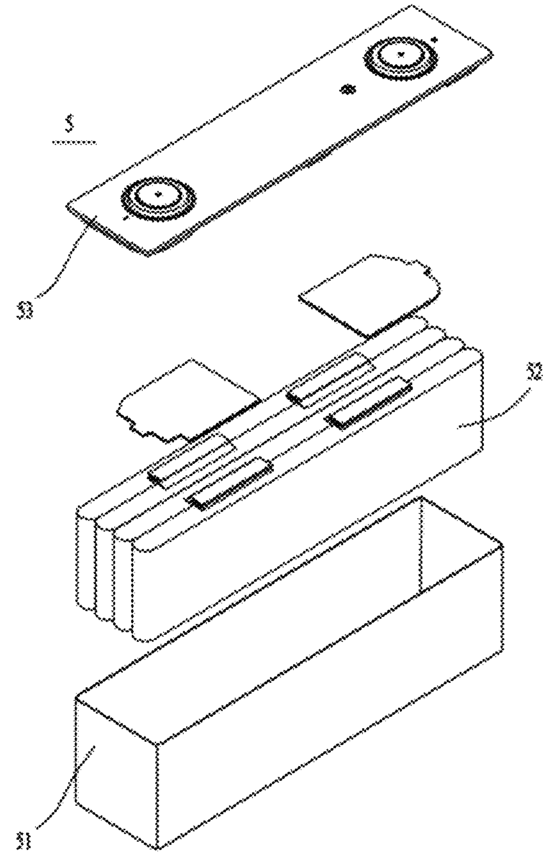
FIG. 2 is an exploded schematic diagram of the secondary battery as shown in FIG. 1.

In some embodiments, as shown in FIGS. 1 and 2, the outer packaging may include a housing 51 and a cover plate 53. The housing 51 may include a bottom plate and a side plate connected to the bottom plate, and the bottom plate and side plate enclose to form an accommodation chamber. The housing 51 has an opening connected to the accommodation chamber, and the cover plate 53 covers the opening to close the accommodation chamber. The positive electrode plate, negative electrode plate, and separator may form an electrode assembly 52 through winding or stacking processes. The electrode assembly 52 is encapsulated in the accommodation chamber. The electrolytic solution immerses the electrode assembly 52. The number of electrode components 52 contained in secondary battery 5 may be one or more, and may be adjusted according to needs.

The method for preparing the secondary battery in the present application is well-known. In some embodiments, the positive electrode plate, separator, negative electrode plate, and electrolytic solution may be assembled to form a secondary battery. As an example, the electrode plate, separator, and negative electrode plate can be wound or stacked to form an electrode assembly. The electrode assembly is placed in an outer packaging, dried, and injected with electrolytic solution. After vacuum encapsulation, standing, formation, shaping, and other processes, the secondary battery may be obtained.

In some embodiments of the present application, the secondary battery of the present application may be assembled to form a battery module, and the number of secondary batteries contained in the battery module can be multiple, and the specific number can be adjusted according to the application and capacity of the battery module.

Figure 3:
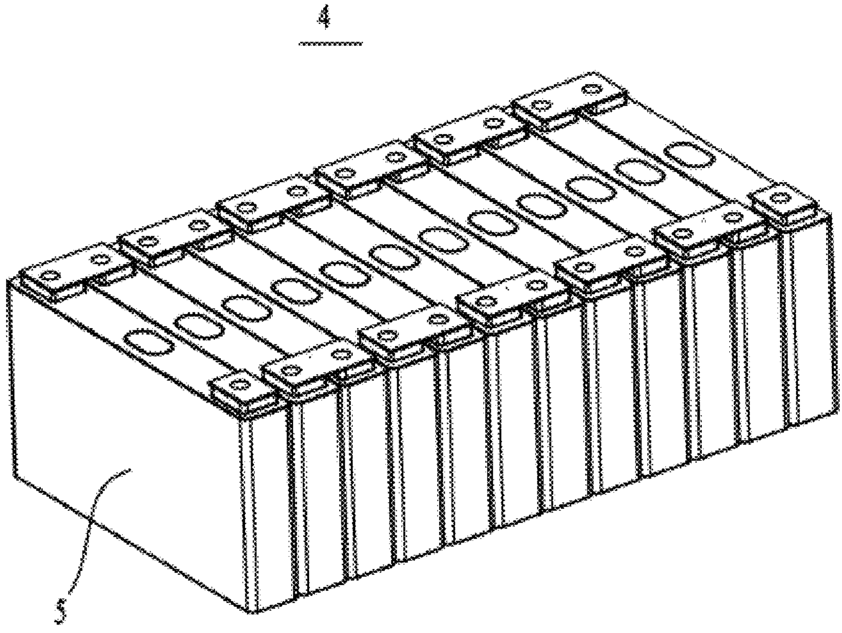
FIG. 3 is a schematic diagram of a battery module according to an embodiment of the present application.

FIG. 3 is a schematic diagram of battery module 4 as an example. As shown in FIG. 3, in battery module 4, multiple secondary batteries 5 can be arranged in sequence along the length direction of battery module 4. Of course, they may be arranged in any other way. Further, the multiple secondary batteries 5 may be secured with fasteners.

Optionally, the battery module 4 may further include a housing with accommodating space, in which multiple secondary batteries 5 are accommodated.

In some embodiments, the above-mentioned battery modules may further be assembled into battery packs, and the number of battery modules contained in the battery pack can be adjusted based on the application and capacity of the battery pack.

Figure 4:
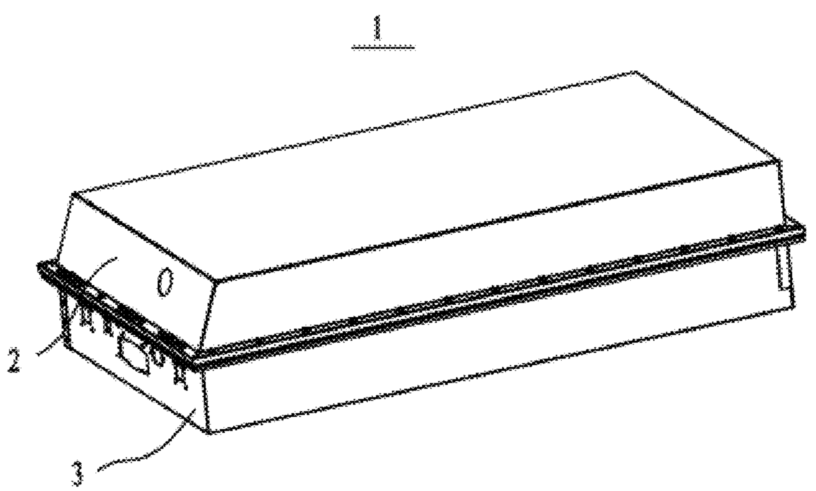
FIG. 4 is a schematic diagram of the battery pack according to one embodiment of the present application.
Figure 5:
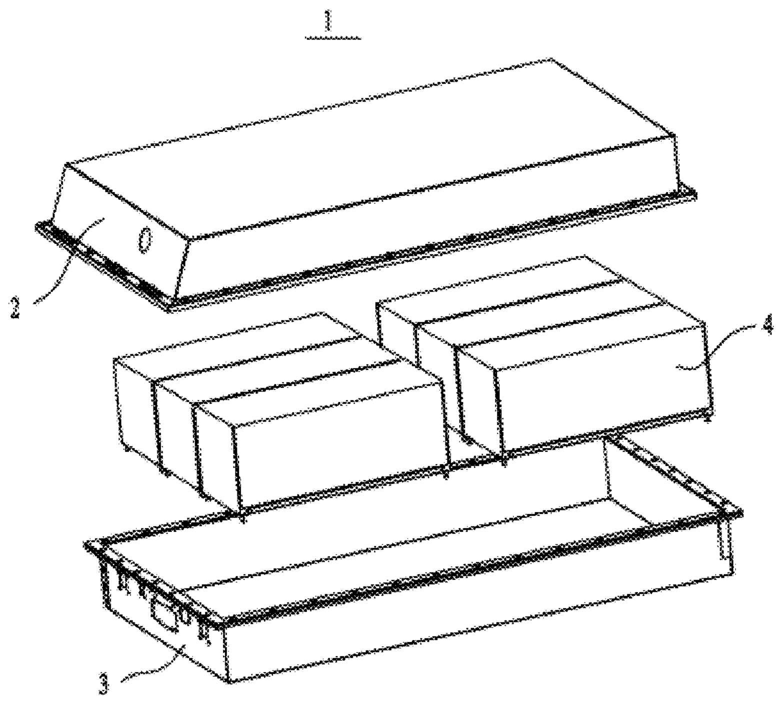
FIG. 5 is an exploded schematic diagram of the battery pack as shown in FIG. 4.

FIGS. 4 and 5 are schematic diagrams of battery pack 1 as an example. As shown in FIGS. 4 and 5, the battery pack 1 may include a battery box and multiple battery modules 4 arranged in the battery box. The battery box includes an upper box 2 and a lower box 3. The upper box 2 covers the lower box 3 and forms a closed space for accommodating the battery module 4. Multiple battery modules 4 may be arranged in any way in the battery box.

Electrical Device

In the second aspect, the present application provides an electrical device, including at least one of the secondary battery, battery module, and battery pack of the present application. The secondary battery, battery module, and battery pack may be used as the electric source of the electrical device or the energy storage unit of the electrical device. The electric device may be, but are not limited to mobile devices (such as mobile phones, laptops, etc.), electric vehicles (such as pure electric vehicles, hybrid electric vehicles, plug-in hybrid electric vehicles, electric bicycles, electric scooters, electric golf carts, electric trucks, etc.), electric trains, ships and satellites, energy storage systems, etc.

The electric device may be selected as the secondary batteries, battery modules, or battery packs based on the usage thereof.

Figure 6:
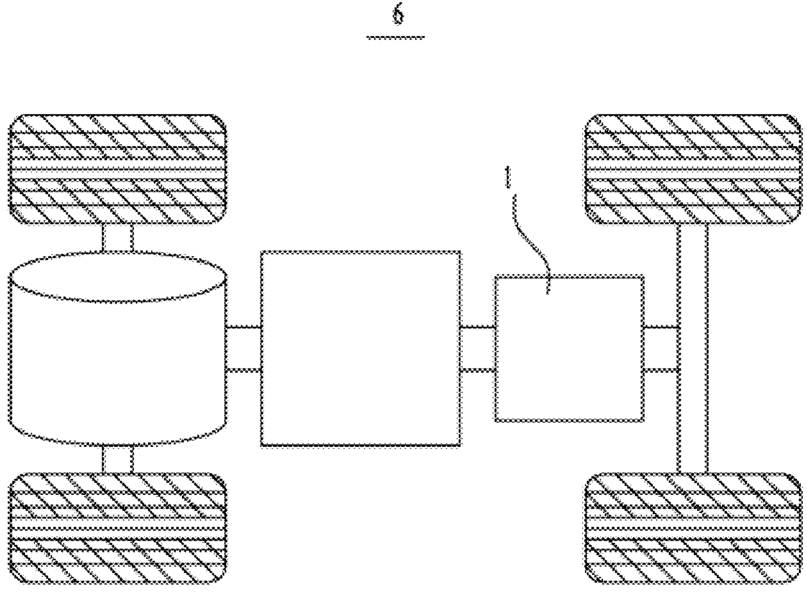
FIG. 6 is a schematic diagram of an electrical device according to one embodiment of the present application, including the secondary battery of the present application as a power supply.

FIG. 6 is a schematic diagram of an electrical device as an example. The electrical device 6 is a pure electric vehicle, hybrid electric vehicle, or plug-in hybrid electric vehicle, etc. To meet the requirements for high power and energy density of the electrical device, the battery pack 1 or battery module may be used.

As another example, the electrical device may be mobile phones, tablets, laptops, etc. The electrical device usually requires to be light and thin, and can adopt the secondary battery as the power source.

EXAMPLES

Hereinbelow, the implementations of the present application will be described. The embodiments as described below are exemplary and are only intended to explain the present application, but should not be understood as limitations to the present application. Where the embodiment in which the specific technology or conditions are not specified, the technology or conditions may be employed according to those described in the literature in the art or the product manual. The reagents or instruments used without specifying the manufacturer are conventional products that are commercially available.

Example 1

1. Preparation of Positive Electrode Plate

An aluminum foil having a thickness of 12 μm is used as the positive current collector.

The positive electrode active substance $LiNi_{0.8}Co_{0.1}Mn_{0.1}O_2$(NCM811), conductive carbon black, and binder polyvinylidene fluoride (PVDF), in a weight ratio of 97.5:1.4:1.1, were mixed in an appropriate amount of NMP as the solvent under stirring, to form a uniform positive electrode slurry; the positive electrode slurry was evenly applied on the surface of the aluminum foil as the positive electrode current collector, after drying and cold pressing, a positive electrode plate was obtained.

2. Preparation of Negative Electrode Plate

A copper foil having a thickness of 8 μm was used as the negative electrode current collector.

The artificial graphite and the natural graphite as the second negative electrode active materials, styrene butadiene rubber (SBR) as the binder, carboxymethyl cellulose sodium (CMC-Na) as the thickener, and conductive agent carbon black (Super P), in a weight ratio of 96.2:1.8:1.2:0.8, were mixed in an appropriate amount of deionized water as the solvent under stirring, to form a uniform second negative electrode slurry; the second negative electrode slurry was evenly applied on the surface of the copper foil as the negative electrode current collector, after drying and cold pressing, the second film layer was obtained. The artificial graphite and the natural graphite were mixed in the ratio of 1:1.

The artificial graphite as the first negative electrode active material, styrene-butadiene rubber (SBR) as the binder, carboxymethyl cellulose sodium (CMC-Na) as the thickener, and carbon black (Super P) as the conductive agent, in a weight ratio of 96.2:1.8:1.2:0.8, were mixed in an appropriate amount of deionized water as the solvent under stirring, to form a uniform first negative electrode slurry; the first negative electrode slurry was evenly applied on the surface of the second film layer, after drying and cold pressing, the first film layer was obtained. The negative current collector, the second film layer, and the first film layer constitutes the negative electrode plate.

3. Separator

A porous polyethylene (PE) film was used as the separator.

4. Preparation of Electrolytic Solution

In an environment with a water content of less than 10 ppm, ethylene carbonate EC and diethyl carbonate DMC, as the non-aqueous organic solvents, were mixed in a volume ratio of 1:1 to obtain an electrolytic solvent. Subsequently, the lithium salt was mixed with the mixed solvent to prepare an electrolytic solution with a lithium salt concentration of 1 mol/L.

5. Preparation of Secondary Batteries

The positive electrode plate, separator, and negative electrode plate were stacked in sequence, so that the separator separated the positive electrode plate from the negative electrode plate, and then they were wound to obtain the electrode assembly; the electrode assembly was placed in an outer packaging, after drying, the electrolytic solution was injected, after vacuum encapsulation, standing, formation, shaping, and other processes, a lithium-ion battery was obtained.

Example 2

In Examples 2-1 to 2-5, the lithium-ion batteries were prepared by the method similar to Example 1, except that in Example 2, the reversible capacity A of the positive electrode active material per unit area of the positive electrode current collector were adjusted.

Example 3

In Examples 3-1 to 3-5, the lithium-ion batteries were prepared by the method similar to Example 1, except that in Example 3, the thickness T of the negative electrode film layer were adjusted.

Example 4

In Examples 4-1 to 4-3, the lithium-ion batteries were prepared by the method similar to Example 1, except that in Example 4, adjusted the volume average particle sizes D of the negative electrode active material contained in the negative electrode film layer were adjusted.

Example 5

In Examples 5-1 to 5-2, the lithium-ion batteries were prepared by a method similar to Example 1, except that in Example 5, the volume average particle sizes D of the negative electrode active material contained in the negative electrode film layer were adjusted.

Example 6

In Example 6, the lithium-ion battery was prepared by the method similar to Example 1, except that in Example 6, the negative electrode film layer has single film layer and the preparation process of the negative electrode plate was adjusted. Specifically, the artificial graphite, styrene butadiene rubber (SBR) as the binder, carboxymethyl cellulose sodium (CMC-Na) as the thickener, and carbon black (Super P) as the conductive agent, in a weight ratio of 96.2:1.8:1.2:0.8, were mixed in an appropriate amount of deionized water as the solvent under stirring, to form a uniform negative electrode slurry; the negative electrode slurry was evenly applied on the surface of the copper foil as the negative electrode current collector, after drying and cold pressing, the negative electrode plate was obtained.

Example 7

Example 7, the lithium-ion battery was prepared by the method similar to Example 1, except that in Example 7, the positive electrode active material was adjusted.

Example 8

In Examples 8-1 to 8-3, the lithium-ion batteries were prepared by the method similar to Example 1, except that in Example 8, the OI values of the negative electrode film layer were adjusted.

Comparative Example 1

In Comparative Example 1, the lithium-ion battery was prepared by the method similar to Example 1, except that in Comparative Example 1, the preparation process of the negative electrode plate was adjusted. Specifically, the artificial graphite, styrene butadiene rubber (SBR) as the binder, carboxymethyl cellulose sodium (CMC-Na) as the thickener, and carbon black (Super P) as the conductive agent, in a weight ratio of 96.2:1.8:1.2:0.8, were mixed in an appropriate amount of deionized water as the solvent under stirring, to form a uniform negative electrode slurry; the negative electrode slurry was evenly applied on the surface of the copper foil as the negative electrode current collector, after drying and cold pressing, the negative electrode plate was obtained.

Comparative Example 2

In Comparative Example 2, the lithium-ion battery was prepared by the method similar to Example 1, except that in Comparative Example 2, the preparation process of the negative electrode plate was adjusted. Specifically, the artificial graphite, styrene butadiene rubber (SBR) as the binder, carboxymethyl cellulose sodium (CMC-Na) as the thickener, and carbon black (Super P) as the conductive agent, in a weight ratio of 96.2:1.8:1.2:0.8, were mixed in an appropriate amount of deionized water as the solvent under stirring, to form a uniform negative electrode slurry; the negative electrode slurry was evenly applied on the surface of the copper foil as the negative electrode current collector, after drying and cold pressing, the negative electrode plate was obtained.

The parameters of the Examples and Comparative Examples are shown in Tables 1 and 2. In Table 1, T=T1+T2, and sigma=(1000*(B/A))/((T*D)*($n^2$/4)), n=4.

TABLE 1

| | Negative electrode plate | | | | | | | Positive electrode plate | | | | Of value of the negative | | |
|---|---|---|---|---|---|---|---|---|---|---|---|---|---|---|
| Nos. | B/ mAh | T/μm | Dv50/ μm | T1/ μm | D1/ μm | T2/ μm | D2/ μm | A/ mAh | Material | B/A | T*D | electrode film layer | sigma | T2*D2 − T1*D1 |
| Example 1 | 68.2 | 86.5 | 12 | 34.61 | 10.00 | 51.91 | 14.00 | 57.8 | NCM622 | 1.18 | 1038.2 | 2.6 | 0.284 | 380.68 |
| Example 2-1 | 68.2 | 86.5 | 12 | 34.61 | 10.00 | 51.91 | 14.00 | 56.8 | NCM622 | 1.20 | 1038.2 | 2.6 | 0.289 | 380.68 |
| Example 2-2 | 68.2 | 86.5 | 12 | 34.61 | 10.00 | 51.91 | 14.00 | 55.9 | NCM622 | 1.22 | 1038.2 | 2.6 | 0.294 | 380.68 |
| Example 2-3 | 68.2 | 86.5 | 12 | 34.61 | 10.00 | 51.91 | 14.00 | 55.0 | NCM622 | 1.24 | 1038.2 | 2.6 | 0.299 | 380.68 |
| Example 2-4 | 68.2 | 86.5 | 12 | 34.61 | 10.00 | 51.91 | 14.00 | 54.1 | NCM622 | 1.26 | 1038.2 | 2.6 | 0.303 | 380.68 |
| Example 2-5 | 68.2 | 86.5 | 12 | 34.61 | 10.00 | 51.91 | 14.00 | 53.3 | NCM622 | 1.28 | 1038.2 | 2.6 | 0.308 | 380.68 |
| Example 3-1 | 62.1 | 78.8 | 12 | 31.51 | 10.00 | 47.27 | 14.00 | 50.9 | NCM622 | 1.22 | 945.4 | 2.6 | 0.323 | 346.63 |
| Example 3-2 | 58.4 | 74.1 | 12 | 29.65 | 10.00 | 44.48 | 14.00 | 47.9 | NCM622 | 1.22 | 889.6 | 2.6 | 0.343 | 326.20 |
| Example 3-3 | 54.8 | 69.5 | 12 | 27.80 | 10.00 | 41.70 | 14.00 | 44.9 | NCM622 | 1.22 | 833.9 | 2.6 | 0.366 | 305.78 |
| Example 3-4 | 71.9 | 91.2 | 12 | 36.46 | 10.00 | 54.70 | 14.00 | 58.9 | NCM622 | 1.22 | 1093.9 | 2.6 | 0.279 | 401.10 |
| Example 3-5 | 80.4 | 102.0 | 12 | 40.80 | 10.00 | 61.20 | 14.00 | 65.9 | NCM622 | 1.22 | 1223.9 | 2.6 | 0.249 | 448.77 |
| Example 4-1 | 68.2 | 86.5 | 10 | 34.61 | 8.00 | 51.91 | 12.00 | 57.8 | NCM622 | 1.18 | 865.2 | 2.6 | 0.341 | 346.07 |
| Example 4-2 | 68.2 | 86.5 | 8 | 34.61 | 6.00 | 51.91 | 10.00 | 57.8 | NCM622 | 1.18 | 692.1 | 2.6 | 0.426 | 311.46 |
| Example 4-3 | 68.2 | 86.5 | 14 | 34.61 | 12.00 | 51.91 | 16.00 | 57.8 | NCM622 | 1.18 | 1211.2 | 2.6 | 0.244 | 415.28 |
| Example 5-1 | 68.2 | 86.5 | 10 | 34.61 | 6.00 | 51.91 | 14.00 | 57.8 | NCM622 | 1.18 | 865.2 | 2.6 | 0.341 | 519.10 |
| Example 5-2 | 68.2 | 86.5 | 14 | 34.61 | 14.00 | 51.91 | 14.00 | 57.8 | NCM622 | 1.18 | 1211.2 | 2.6 | 0.244 | 242.25 |
| Example 6 | 68.2 | 86.5 | 12 | \ | \ | 86.52 | 12.00 | 56.8 | NCM622 | 1.20 | 1038.2 | 2.6 | 0.289 | \ |
| Example 7 | 68.2 | 86.5 | 12 | 34.61 | 10.00 | 51.91 | 14.00 | 56.8 | NCM811 | 1.20 | 1038.2 | 2.6 | 0.289 | 380.68 |
| Example 8-1 | 68.2 | 86.5 | 12 | 34.61 | 10.00 | 51.91 | 14.00 | 56.8 | NCM622 | 1.20 | 1038.2 | 7.6 | 0.289 | 380.68 |
| Example 8-2 | 68.2 | 86.5 | 12 | 34.61 | 10.00 | 51.91 | 14.00 | 56.8 | NCM622 | 1.20 | 1038.2 | 12.6 | 0.289 | 380.68 |
| Example 8-3 | 68.2 | 86.5 | 12 | 34.61 | 10.00 | 51.91 | 14.00 | 56.8 | NCM622 | 1.20 | 1038.2 | 17.9 | 0.289 | 380.68 |
| Comparative Example 1 | 78.7 | 99.8 | 22 | 39.93 | 22.00 | 59.90 | 22.00 | 75.0 | NCM622 | 1.05 | 2196.2 | 2.6 | 0.120 | 439.24 |
| Comparative Example 2 | 47.2 | 59.9 | 8 | 23.96 | −6.00 | 35.94 | 22.00 | 33.7 | NCM622 | 1.40 | 479.2 | 2.6 | 0.730 | 934.39 |

TABLE 2

| Nos. | anode potential @ 4C CC 100 s (mV) | 100% SOC storage life under 60° C. 120 Day reversible capacity (@80% SOH Day) | 20% SOC to 80% SOC charging time (min) |
|---|---|---|---|
| Example 1 | 2024 | 9470% | 974 |
| Example 2-1 | 2169 | 9320% | 967 |
| Example 2-2 | 2313 | 9310% | 959 |
| Example 2-3 | 2458 | 9140% | 952 |

TABLE 2-continued

| Nos. | anode potential @ 4C CC 100 s (mV) | 100% SOC storage life under 60° C. 120 Day reversible capacity (@80% SOH Day) | 20% SOC to 80% SOC charging time (min) |
|---|---|---|---|
| Example 2-4 | 2602 | 9045% | 945 |
| Example 2-5 | 2747 | 9020% | 938 |
| Example 3-1 | 3179 | 9280% | 916 |
| Example 3-2 | 3785 | 9305% | 886 |
| Example 3-3 | 4472 | 9300% | 851 |
| Example 3-4 | 1864 | 9220% | 982 |
| Example 3-5 | 976 | 9300% | 1026 |
| Example 4-1 | 3729 | 9500% | 889 |
| Example 4-2 | 6286 | 9470% | 761 |
| Example 4-3 | 807 | 9455% | 1035 |
| Example 5-1 | 3729 | 9500% | 889 |
| Example 5-2 | 807 | 9430% | 1035 |
| Example 6 | 2169 | 9345% | 967 |
| Example 7 | 2169 | 9380% | 967 |
| Example 8-1 | 2169 | 9380% | 967 |
| Example 8-2 | 2169 | 9390% | 967 |
| Example 8-3 | 2169 | 9410% | 967 |
| Comparative Example 1 | −2914 | 9530% | 1221 |
| Comparative Example 2 | 8913 | 8330% | 654 |

As shown in Tables 1 and 2, as compared with Comparative Example 1 and Comparative Example 2, in the Examples of the present application, by adjusting and controlling 0.15≤(1000*(B/A))/((T*D)*($n^2$/4))≤0.50, especially 0.15≤(1000*(B/A))/((T*D)*($n^2$/4))≤0.40, and further 0.20≤(1000*(B/A))/((T*D)*($n^2$/4))≤0.35, the negative electrode active material has sufficient remaining vacancies for the intercalation of the active ions such as lithium ions, so as to avoid the overpotential caused by the surface polarization of the negative electrode plate, which makes the potential with reference to the lithium be lower than the lithium-deposition potential of the lithium metal and further causes the problems such as lithium deposition. Accordingly, the secondary battery can be ensured to have safety performance when being charged at a high rate. In addition, by adjusting and controlling the relevant parameters of the negative electrode plate, such as the layer structure and thickness of the negative electrode film, the volume average particle size D of the negative electrode active material, and the type of positive electrode active material, the performances of the secondary battery can be adjusted accordingly.

Tests

1. Test of Fast-Charging Performance of the Secondary Battery

At 25° C., the secondary battery as prepared above were charged at a constant current of 0.33 C to a charging cut-off voltage of 4.4V, then charged at the constant voltage to a current of 0.05 C, after standing for 5 minutes, it was discharged at a constant current of 0.33 C to a discharging cut-off voltage of 2.8V. The actual capacity was recorded as C0.

Then the secondary battery was charged at a constant current of 0.5C0, 1C0, 1.5C0, 2C0, 2.5C0, 3C0, 3.5C0, 4C0, and 4.5C0 sequentially to the full battery charging cut-off voltage of 4.4V or negative electrode cut-off potential of OV (whichever reached first), and after each charging, the secondary battery was discharged at 1C0 to the full battery discharging cut-off voltage of 2.8V; the corresponding negative electrode potentials, when charging to 10%, 20%, 30% . . . 80% SOC (State of Charge) at different charging rates, were recorded. The charging rate versus negative electrode potential curves were plotted for different SOC states, and through the linear fitting, the charging rates correspond to OV of the negative electrode potential at different SOC states were obtained. The charging rates are the charging windows for those SOC states, denoted as C10% SOC, C20% SOC, C30% SOC, C40% SOC, C50% SOC, C60% SOC, C70% SOC, and C80% SOC. According to the formula (60/C20% SOC+60/C30% SOC+60/C40% SOC+60/C50% SOC+60/C60% SOC+60/C70% SOC+60/C80% SOC)×10%, the charging time T of the secondary battery from 10% SOC to 80% SOC was calculated. The shorter the charging time T, the better the fast-charging performance of the secondary battery.

2. Storage Life of Secondary Batteries

At 25° C., the secondary batteries as prepared above were charged to the upper limit of the charging rated voltage at a constant current of 033 C, then were charged to a current of 0.05 C at a constant voltage, after standing for 5 minutes, and then were discharged to the lower limit of the discharging rated voltage at a constant current of 033 C, the actual capacity was recorded as C0.

Then the secondary batteries as prepared were stored under a constant temperature environment of 60° C., and the discharge capacity of the stored batteries were tested every 15 days according to the above method for testing the capacity, denoted as Cn (n=1, 2, 3 . . . , which represents the storage time of 15, 30, 45 . . . , n*15 days); the value of Cn/C0 is defined as the capacity retention rate after storage; the ratio of the discharging capacity of the secondary battery to the initial capacity of the secondary battery is the storage life; by comparing the ratio at the same days of storage, the storage life of the secondary battery could be evaluated. The higher the ratio, the longer the storage life of the secondary battery.

3. Potential Test of Negative Electrode Plate

A copper wire was placed between the positive electrode and the negative electrode of each of the secondary batteries as prepared above and was led out as the third electrode.

At 25° C., with the third electrode as the anode and the negative electrode of the battery as the cathode, the constant current (CC) charging at a current of 20 uA was carried on for 2 hours, and then with the third electrode as the anode and the positive electrode of the battery as the cathode, the constant current (CC) charging at a current of 20 uA was carried on for 2 hours, after which the lithium plating on the third electrode was completed; the potential between the third electrode and the negative electrode of the battery was the potential of the negative electrode with reference to the lithium.

At 25° C., the batteries were 033C DC to 25V, after standing for 1 hour, were 4C CC for 100s; the potential between the third electrode and the negative electrode was monitored simultaneously, the potential at the end of charging was denoted as the anode potential (negative electrode potential).

Although the present application has been described with reference to preferred embodiments, various improvements can be made and components can be replaced with equivalents without departing from the scope of the present application. Especially, as long as there is no structural conflict, the various technical features mentioned in each embodiment can be combined in any way. The present application is not limited to the specific embodiments disclosed in the text, but includes all technical solutions falling within the scope of the claims.

What is claimed is:

1. A secondary battery, comprising:

a positive electrode plate comprising a positive electrode current collector and a positive electrode film layer which is arranged on at least one of surfaces of the positive electrode current collector and comprises a positive electrode active material; and a negative electrode plate comprising a negative electrode current collector and a negative electrode film layer which is arranged on at least one of surfaces of the negative electrode current collector and comprises a negative electrode active material, wherein the secondary battery satisfies 0.15≤(1000*(B/A))/((T*D)*($n^2$/4))≤0.50, in which B/A represents a dimensionless capacity-excess coefficient of a negative electrode of the secondary battery, T represents a thickness of the negative electrode film layer, in μm, and D represents a volume average particle size (Dv50) of the negative electrode active material, in μm.

2. The secondary battery according to claim 1, wherein the secondary battery satisfies:

$$0.15 \le (1000*(B/A))/((T*D)*(n^2/4)) \le 0.40; \text{ or}$$

$$0.20 \le (1000*(B/A))/((T*D)*(n^2/4)) \le 0.35.$$

3. The secondary battery according to claim 1, wherein the secondary battery, at at least one point of time $T_0$ during charging, has a charging current $I_0$ that is greater than or equal to n times of a nominal capacity, wherein 2.8≤n, or, 4≤n≤8, or, 4≤n≤6 or 6≤n≤8.

4. The secondary battery according to claim 1, wherein the secondary battery, during charging to from 10% state-of-charge to 70% state-of-charge, has an average charging current $I_\tau$ that is greater than or equal to n times of a nominal capacity, wherein 4<n, or, 4≤n≤8, or, 4≤n≤6 or 6≤n≤8;

or, the secondary battery, during charging to from 20% state-of-charge to 60% state-of-charge, has an average charging current I, that is greater than or equal to n times of the nominal capacity.

5. The secondary battery according to claim 1, wherein the secondary battery satisfies at least one of the following conditions from (1) to (3):

$$1.20 \leq B/A \leq 1.50, \text{ or, } 1.20 \leq B/A \leq 1.30; \quad (1)$$

$$20 \leq T \leq 200, \text{ or, } 40 \leq T \leq 150; \text{ or} \quad (2)$$

$$1 \leq D \leq 30, \text{ or, } 5 \leq D \leq 15. \quad (3)$$

6. The secondary battery according to claim 1, wherein the negative electrode film layer comprises:

a first film layer which comprises a first negative electrode active material and is arranged on a surface of the negative electrode current collector; and a second film layer which comprises a second negative electrode active material and is arranged between the first film layer and the negative electrode current collector, and wherein the first negative electrode active material and the second negative electrode active material are one or more each independently selected from artificial graphite, natural graphite, soft carbon, hard carbon, silicon-based material, tin-based material, and lithium titanate;

or, the first negative electrode active material and the second negative electrode active material are different materials; and or, the first negative electrode active material comprises the artificial graphite, and the second negative electrode active material comprises the artificial graphite and the natural graphite.

7. The secondary battery according to claim 6, wherein the secondary battery satisfies $0 \leq T2*D2-T1*D1 \leq 2000$, in which T1 represents the thickness of the first film layer, in μm, T2 represents the thickness of the second film layer, in μm, D1 represents the volume average particle size (Dv50) of the first negative electrode active material, in μm, and D2 represents the volume average particle size (Dv50) of the second negative electrode active material, in μm.

8. The secondary battery according to claim 7, wherein the secondary battery satisfies at least one of the following conditions from (I) to (IV):

$$10 \leq T1 \leq 110; \quad (I)$$

$$5 \leq D1 \leq 20; \quad (II)$$

$$10 \leq T2 \leq 110; \text{ or} \quad (III)$$

$$2 \leq D2 \leq 15. \quad (IV)$$

9. The secondary battery according to claim 6, wherein the secondary battery further satisfies V>V2, in which V represents an OI value of the negative electrode film layer, and V2 represents an OI value of the second film layer;

$$\text{or, } 0.1 \leq V \leq 25; \text{ or}$$

-continued $$0.1 \leq V2 \leq 5.$$

10. The secondary battery according to claim 1, wherein the positive electrode active material has a molecular formula of $Li_xA_yNi_aCo_bMn_cM_{(1-a-b-c)}Y_z$, in which $0 \leq x \leq 2.1$, $0 \leq y \leq 2.1$, $0.9 \leq x+y \leq 2.1$, $0 \leq a \leq 1$, $0 \leq b \leq 1$, $0 \leq c \leq 1$, $0.1 \leq a+b+c \leq 1$, and $1.8 \leq z \leq 3.5$;

A is one or more selected from Na, K, and Mg; M is one or more selected from B, Mg, Al, Si, P, S, Ca, Sc, Ti, V, Cr, Fe, Cu, Zn, Sr, Y, Zr, Nb, Mo, Cd, Sn, Sb, Te, Ba, Ta, W, Yb, La, and Ce; and Y is one or more selected from O, and F.

11. An electrical device, including a secondary battery, the secondary battery, comprising:

a positive electrode plate comprising a positive electrode current collector and a positive electrode film layer which is arranged on at least one of surfaces of the positive electrode current collector and comprises a positive electrode active material; and a negative electrode plate comprising a negative electrode current collector and a negative electrode film layer which is arranged on at least one of surfaces of the negative electrode current collector and comprises a negative electrode active material, wherein the secondary battery satisfies $0.15 \leq (1000*(B/A))/((T*D)*(n^2/4)) \leq 0.50$, in which B/A represents a dimensionless capacity-excess coefficient of a negative electrode of the secondary battery, T represents a thickness of the negative electrode film layer, in μm, and D represents a volume average particle size (Dv50) of the negative electrode active material, in μm.

12. The electrical device according to claim 11, wherein the secondary battery satisfies:

$$0.15 \leq (1000*(B/A))/((T*D)*(n^2/4)) \leq 0.40; \text{ or}$$

$$0.20 \leq (1000*(B/A))/((T*D)*(n^2/4)) \leq 0.35.$$

13. The electrical device according to claim 11, wherein the secondary battery, at at least one point of time $T_0$ during charging, has a charging current $I_0$ that is greater than or equal to n times of a nominal capacity, wherein 2.8<n, or, 4≤n≤8, or, 4≤n≤6 or 6≤n≤8.

14. The electrical device according to claim 11, wherein the secondary battery, during charging to from 10% state-of-charge to 70% state-of-charge, has an average charging current $I_\tau$ that is greater than or equal to n times of a nominal capacity, wherein 4≤n, or, 4≤n≤8, or, 4≤n≤6 or 6≤n≤8;

or, the secondary battery, during charging to from 20% state-of-charge to 60% state-of-charge, has an average charging current I, that is greater than or equal to n times of the nominal capacity.

15. The electrical device according to claim 11, wherein the secondary battery satisfies at least one of the following conditions from (1) to (3):

$$1.20 \leq B/A \leq 1.50, \text{ or, } 1.20 \leq B/A \leq 1.30; \quad (1)$$

$$20 \leq T \leq 200, \text{ or, } 40 \leq T \leq 150; \text{ or} \quad (2)$$

-continued $$1 \leq D \leq 30, \text{ or, } 5 \leq D \leq 15. \quad (3)$$

16. The electrical device according to claim 11, wherein the negative electrode film layer comprises:

a first film layer which comprises a first negative electrode active material and is arranged on a surface of the negative electrode current collector; and a second film layer which comprises a second negative electrode active material and is arranged between the first film layer and the negative electrode current collector, and wherein the first negative electrode active material and the second negative electrode active material are one or more each independently selected from artificial graphite, natural graphite, soft carbon, hard carbon, silicon-based material, tin-based material, and lithium titanate;

or, the first negative electrode active material and the second negative electrode active material are different materials; and or, the first negative electrode active material comprises the artificial graphite, and the second negative electrode active material comprises the artificial graphite and the natural graphite.

17. The electrical device according to claim 16, wherein the secondary battery satisfies $0<T2*D2-T1*D1\leq 2000$, in which T1 represents the thickness of the first film layer, in μm, T2 represents the thickness of the second film layer, in μm, D1 represents the volume average particle size (Dv50) of the first negative electrode active material, in μm, and D2 represents the volume average particle size (Dv50) of the second negative electrode active material, in μm.

18. The electrical device according to claim 17, wherein the secondary battery satisfies at least one of the following conditions from (I) to (IV):

$$10 \leq T1 \leq 110; \quad (I)$$

$$5 \leq D1 \leq 20; \quad (II)$$

$$10 \leq T2 \leq 110; \text{ or} \quad (III)$$

$$2 \leq D2 \leq 15. \quad (IV)$$

19. The electrical device according to claim 16, wherein the secondary battery further satisfies V>V2, in which V represents an OI value of the negative electrode film layer, and V2 represents an OI value of the second film layer;

$$\text{or, } 0.1 \leq V \leq 25; \text{ or}$$

$$0.1 \leq V2 \leq 5.$$

20. The electrical device according to claim 11, wherein the positive electrode active material has a molecular formula of $Li_xA_yNi_aCo_bMn_cM_{(1-a-b-c)}Y_z$, in which $0\leq x\leq 2.1$, $0\leq y\leq 2.1$, $0.9\leq x+y\leq 2.1$, $0\leq a\leq 1$, $0\leq b\leq 1$, $0\leq c\leq 1$, $0.1<a+b+c\leq 1$, and $1.8\leq z\leq 3.5$;

A is one or more selected from Na, K, and Mg; M is one or more selected from B, Mg, Al, Si, P, S, Ca, Sc, Ti, V, Cr, Fe, Cu, Zn, Sr, Y, Zr, Nb, Mo, Cd, Sn, Sb, Te, Ba, Ta, W, Yb, La, and Ce; and Y is one or more selected from O, and F.

* * * * *